(12) United States Patent
Marqueling et al.

(10) Patent No.: US 7,628,237 B2
(45) Date of Patent: Dec. 8, 2009

(54) SELF-ALIGNING FIXED GRILLE

(75) Inventors: Mark R. Marqueling, Churubusco, IN (US); Lawrence Hoffman, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 574 days.

(21) Appl. No.: 11/537,277

(22) Filed: Sep. 29, 2006

(65) Prior Publication Data
US 2008/0078595 A1    Apr. 3, 2008

(51) Int. Cl.
*B60K 11/04*  (2006.01)
(52) U.S. Cl. .............. 180/68.4; 180/69.2; 180/68.6; 296/193.1
(58) Field of Classification Search .............. 180/68.4, 180/68.6, 69.2, 69.21, 69.24; 296/193.1
See application file for complete search history.

(56) References Cited

U.S. PATENT DOCUMENTS

| | | | | |
|---|---|---|---|---|
| 2,468,809 A | * | 5/1949 | Brock et al. | 180/69.2 |
| 3,844,369 A | * | 10/1974 | Schroeder et al. | 180/68.6 |
| 4,287,961 A | * | 9/1981 | Steiger | 180/68.4 |
| 4,319,653 A | * | 3/1982 | Carlson | 180/89.17 |
| 4,485,882 A | * | 12/1984 | Ide et al. | 180/68.6 |
| 4,597,603 A | * | 7/1986 | Trabert | 296/193.1 |
| 5,865,500 A | * | 2/1999 | Sanada et al. | 296/193.1 |
| 6,589,307 B2 | * | 7/2003 | Jaramillo et al. | 55/385.3 |
| 6,695,395 B2 | * | 2/2004 | Kallio | 296/202 |
| 6,810,979 B2 | * | 11/2004 | Johansson et al. | 180/69.21 |
| 7,090,265 B2 | * | 8/2006 | Otte | 293/115 |
| 7,255,189 B2 | * | 8/2007 | Kurtz et al. | 180/68.4 |
| 7,261,346 B1 | * | 8/2007 | Kubesh | 293/115 |
| 7,401,672 B2 | * | 7/2008 | Kurtz et al. | 180/68.4 |
| 2003/0052515 A1 | | 3/2003 | Barnard et al. | |
| 2008/0078595 A1 | * | 4/2008 | Marqueling et al. | 180/68.4 |

FOREIGN PATENT DOCUMENTS

EP    0 896 892 A1    2/1999

* cited by examiner

*Primary Examiner*—Jeffrey J Restifo
(74) *Attorney, Agent, or Firm*—Jeffrey P. Calfa; Mark C. Bach

(57) ABSTRACT

A grille for a vehicle, especially for severe service vehicles, is provided. The grille couples to a front reinforcement assembly of the vehicle's hood using a male and female slip joint, such as a boss and track. The grille and hood also hinge together. A spring engages the grille and the cooling module of the vehicle.

17 Claims, 8 Drawing Sheets

SELF-ALIGNING FIXED GRILLE

BACKGROUND OF THE INVENTION

1. Field of the Invention

The present invention relates to a self-aligning fixed grille for motor vehicles, especially for severe service trucks.

2. Description of the Prior Art

The internal combustion engine of a motor vehicle generates large quantities of heat during use. Air-cooled or liquid-cooled cooling systems remove the generated heat from the engine and other components of a motor vehicle.

One liquid cooling system uses a radiator in a coolant circuit with the engine for cooling a coolant or cooling water, and a water pump or a flow control valve to control the flow rate of the coolant that passes through the radiator. The cooling water receives heat from the engine, then returns to the radiator.

In such a cooling water system, a frontally placed radiator transfers heat from the circulating coolant by conductive transfer to ambient air flowing through the radiator. The frontal placement of the radiator takes advantage of ram air for forcing ambient air through the radiator when the vehicle is driven forward.

Unfortunately, the frontal placement of the radiator also makes the radiator vulnerable to debris, such as insects and mud. A large build-up of insects, for example, can interfere with heat exchange and reduce the efficiency of the cooling system.

Grilles are therefore used to prevent damage to the radiator from insects and other debris. A grille provides a portion of the exterior skin of a vehicle, protecting the components of the vehicle and streamlining the vehicle to reduce wind resistance. Grilles in some motor vehicles, such as automobiles, are typically affixed to the bumper of the vehicle. Other vehicles affix the grille to the hood.

The grille of a severe service vehicle, however, is usually stationary and hard mounted to the vehicle's cooling module or radiator. Severe service vehicles are used for construction, government, waste collection and other demanding on/off highway applications. Because severe service vehicles often require equipment mounted to extensions in the front of the vehicle as well as power to run the equipment from the engine, the cooling system is mounted above the frame rails to accommodate the equipment. Mounting the grille to the radiator rather than the front of the hood allows access to the engine compartment through the hood opening, especially when the hood cannot be fully lifted forward due to the presence of the equipment.

The hood typically fastens to the front of the chassis and to the back of the cab and moves relative to the vehicle's body in use. During assembly, the cooling module and the hood are often misaligned relative to one another. To accommodate for this misalignment, the hood and grille are separated by large gaps during use to prevent the front mounted equipment from crashing into the grille during use.

A large amount of adjustability is therefore built into the grille. For aesthetic reasons, however, there is not enough adjustability to compensate for all of the tolerance stack-up in assembly and still allow a sufficient gap between the hood and grille to prevent their contact during use. Because there is frequently a large amount of part interference and poor fit, the manufacture must spend additional money to fulfill the warranty requirements for grille realignment, premature damage and/or accepting the effects to fit and finish reputation.

Therefore, it would be advantageous to develop a grille that would be able to compensate for the tolerance stack-up during assembly while allowing a sufficient gap between the hood and grille to prevent their contact during use. It would be further advantageous to provide a grille that is well-aligned within the vehicle. Still another advantage is to provide a grille that would allow easy access to the engine compartment without fully raising the hood.

SUMMARY OF THE INVENTION

According to the invention there is provided a grille for a vehicle, especially a severe service vehicle. The grille attaches in the vehicle to the cooling module, the hood and the front reinforcement assembly of the hood. The grille has a frame with a bottom frame at the bottom, a top frame at the top and opposite side frames being located between the top and bottom frames. The top frame has opposite front and back faces.

The bottom of the grille hinges to the hood, while the top of the grille couples with the front reinforcement assembly with a male and female slip joint. The grille can engage the cooling module with a spring.

The male and female slip joint can include a boss and a track, with the boss engaging the track. The track has sidewalls, an end wall, and a rear wall connecting to the sidewalls and the end wall. The boss can be wedge-shaped or have a head and shank.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
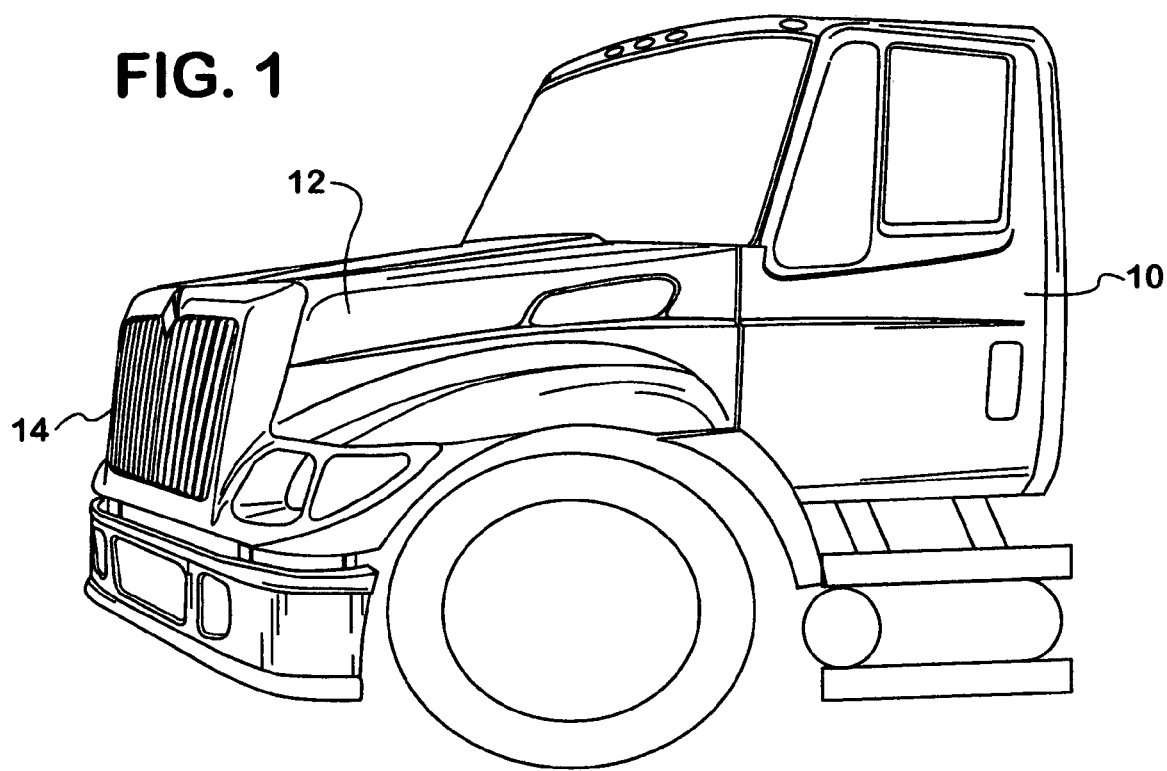
FIG. 1 is a perspective view of a grille of the invention installed within a vehicle.
Figure 2:
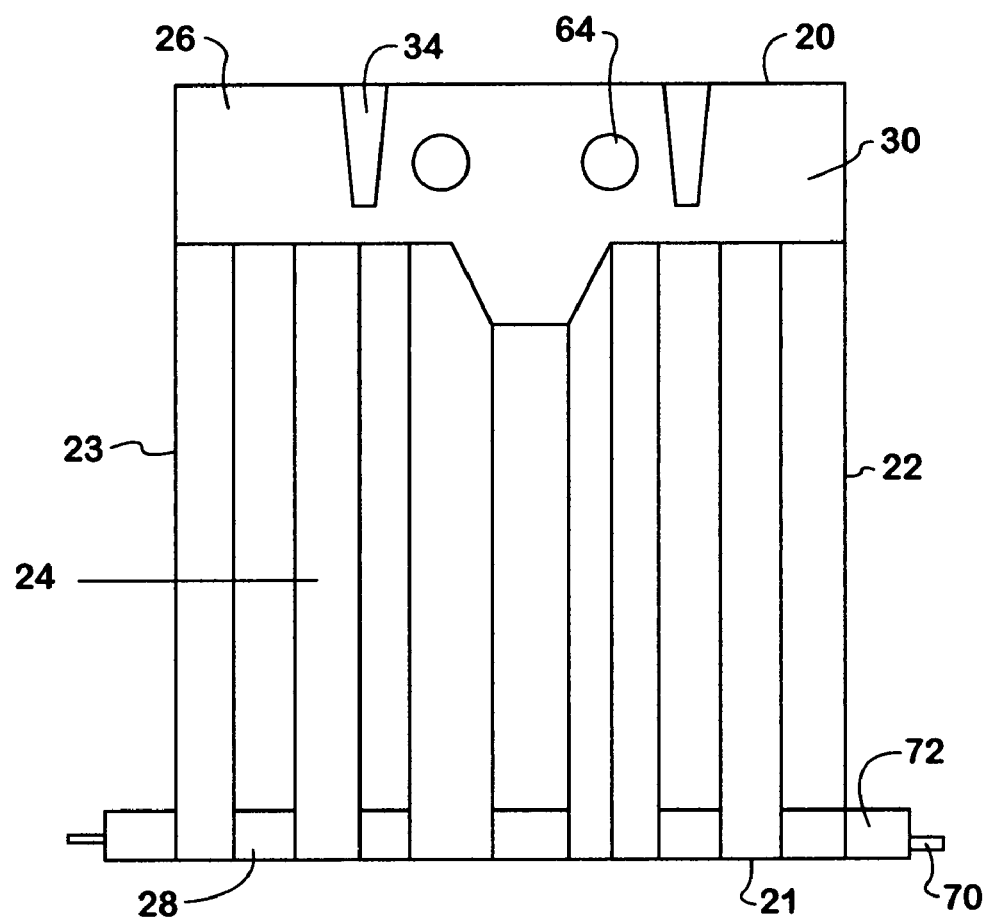
FIG. 2 is a front plan view of a grille of the invention.
Figure 3:
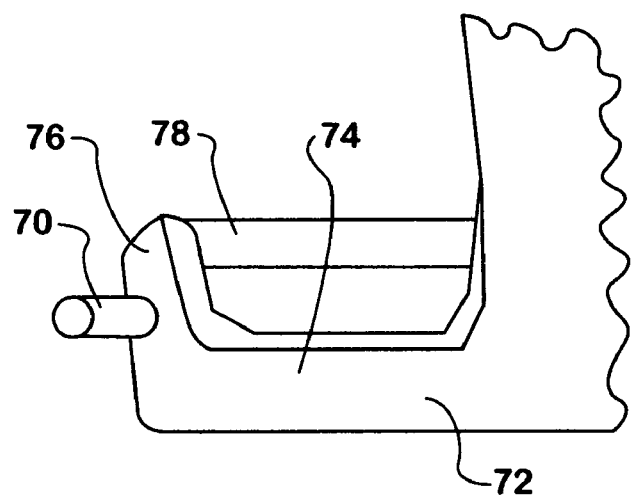
FIG. 3 is a close up view of a hinge extension of a grille of the invention.
Figure 4:
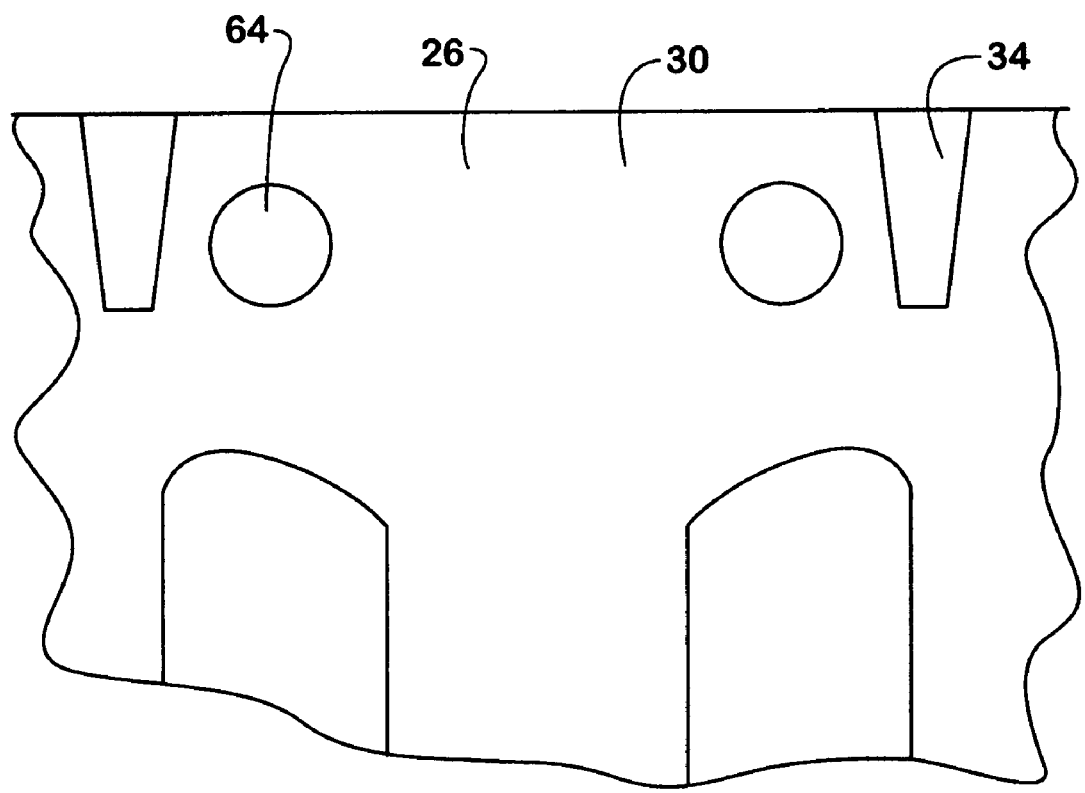
FIG. 4 is a partial front plan view of the top portion of a grille of the invention.

With reference to the Figures where like reference numerals refer to like structures, a large vehicle 10, such as a truck, has a hood 12. The hood 12 and a grille 14 are pivotally attached with a hinge. A front reinforcement assembly 16 attaches to the hood 12 and couples to the grille 14 with a male and female slip joint 80. The male member 47 of the slip joint 80 is preferably a boss 48, 49 which rides in the female member 33 which is preferably a track 34. During use, the boss 48, 49 engages the track 34. The vehicle 10 has a cooling module 18, which can include a radiator.

The grille 14 has a top 20, an opposite bottom 21 and a frame 25. The frame 25 has a top frame 26, a bottom frame and opposite side frames 22, 23 between the top frame 26 and the bottom frame 28. The top frame 26 has a front face 30 and opposite back face 32 at the top 20 of the grille 14. The bottom frame 28 is located at the bottom 21 of the grille 14. The ribs 24 of the grille 14 can form the side frames 22, 23. If the ribs are horizontal, top and bottom horizontal ribs can form the top frame and the bottom frame, respectively.

The top frame 26 can have one or more tracks 34 in the front face 30. Each track 34 extends downwardly from the top 20 toward the bottom 21 and has sidewalls 36, an end wall 38 and a rear wall 40 connecting to the sidewalls 36 and the end wall 38.

The track 34 is preferably tapered vertically. The maximum distance between the sidewalls 36 is at the top and the minimum distance between the sidewalls 36 is at the end wall 38.

The sidewalls 36 are preferably slanted from the rear wall 40 outward. The sidewalls' slant can be continuous from the rear wall 40 to the front face 30. Alternatively, the sidewalls 34 can slant in a stepped fashion, with a first portion 42 of the sidewall 34 slanting outward from the rear wall 40 at a first angle with a second portion 44 of the sidewall 34 slanting outward from the first portion 42 at a second angle. The first portion 42 of the stepped taper, for example, can be angled approximately 90E with the rear wall 40. The second portion 44 of the stepped taper then angles less than 90E from the first portion 42.

Figure 9:
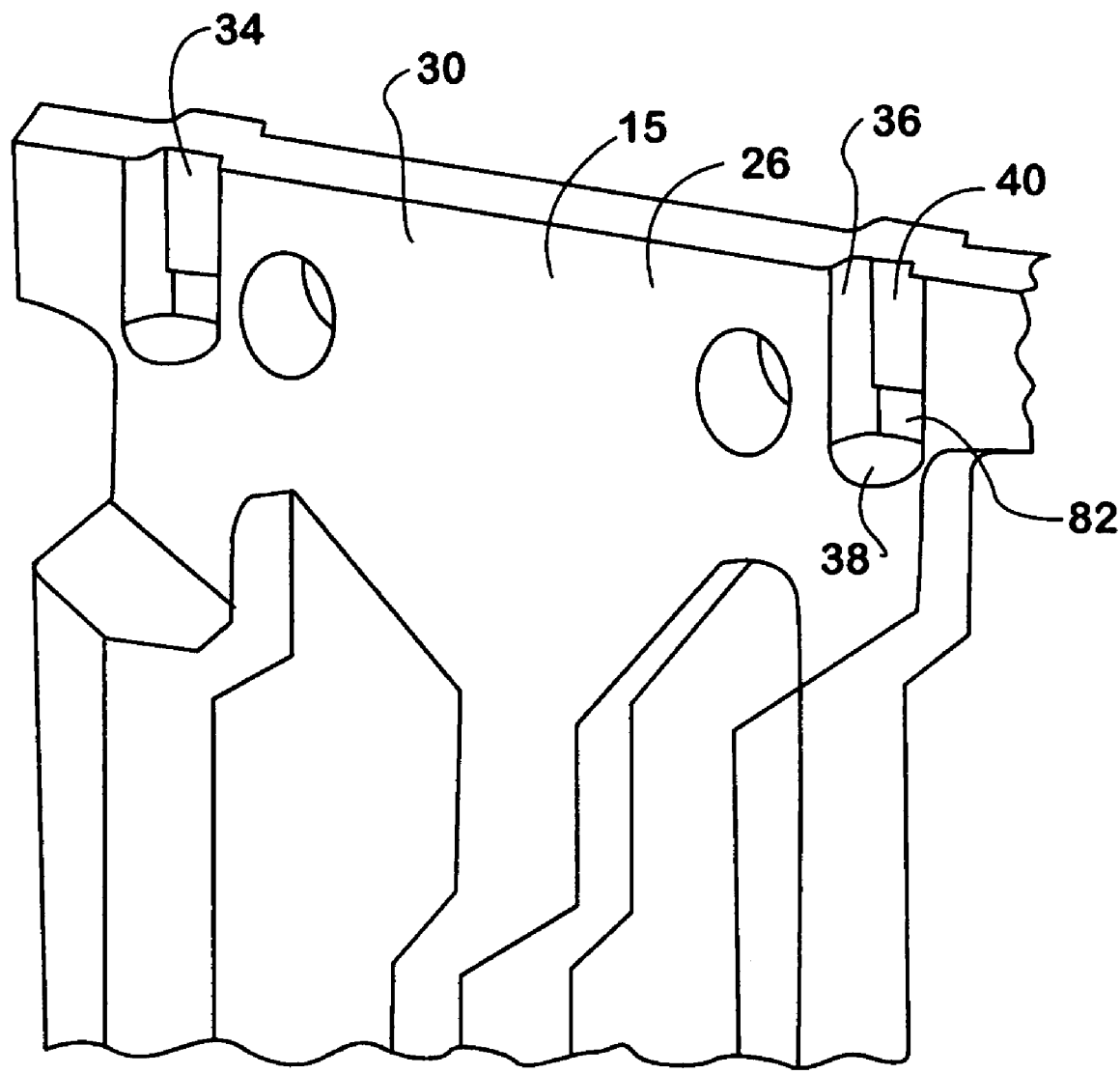
FIG. 9 is a perspective front view of one configuration of a grille of the invention.

Alternatively, the track 34 can be untapered vertically as shown in FIG. 9. FIG. 9 also shows untapered sidewalls 36 with the rear wall 40 being tapered before the end wall 38 forming a detent 82 to trap the boss 49.

Figure 10:
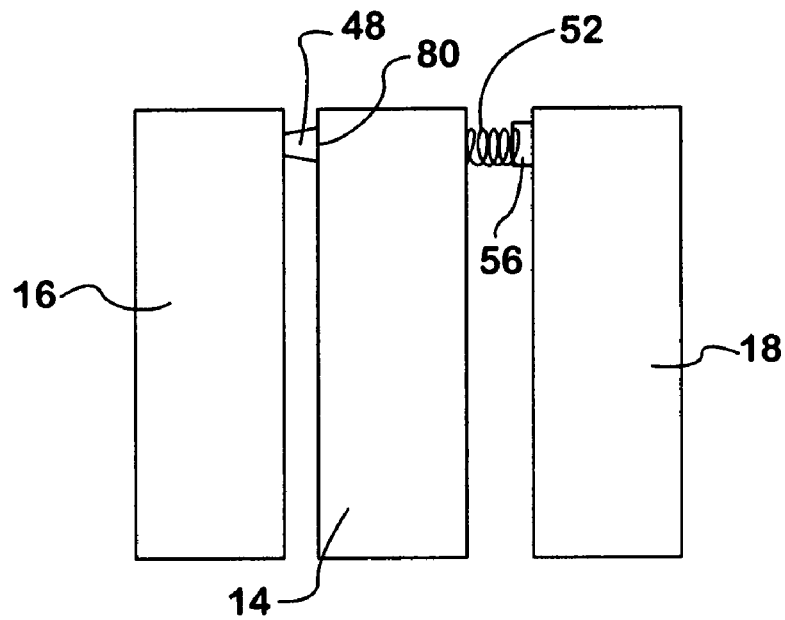
FIG. 10 is a side view of a front reinforcement assembly of the hood, a cooling module and a grille in one configuration of the invention with the hood closed.
Figure 11:
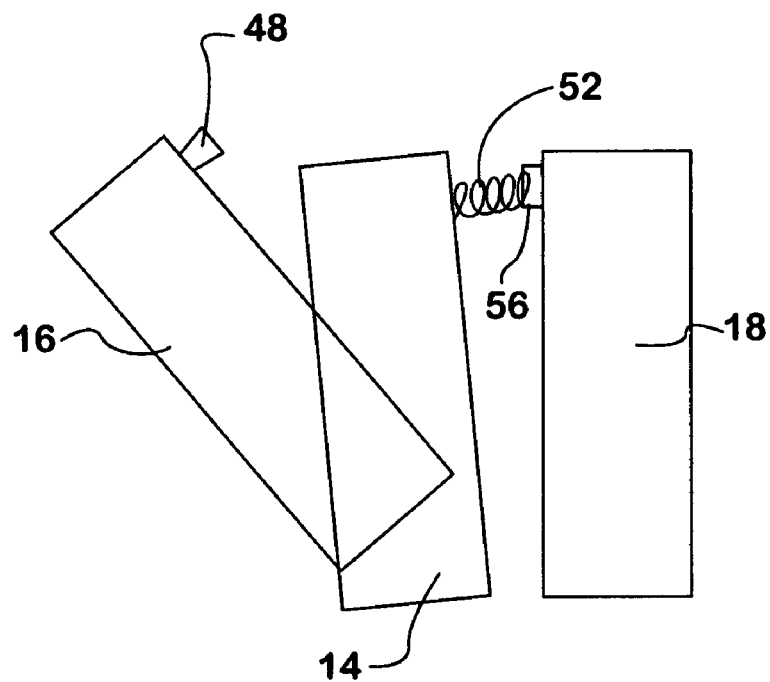
FIG. 11 is a side view of a front reinforcement assembly of the hood, a cooling module and a grille in one configuration of the invention with the hood partially open.
Figure 12:
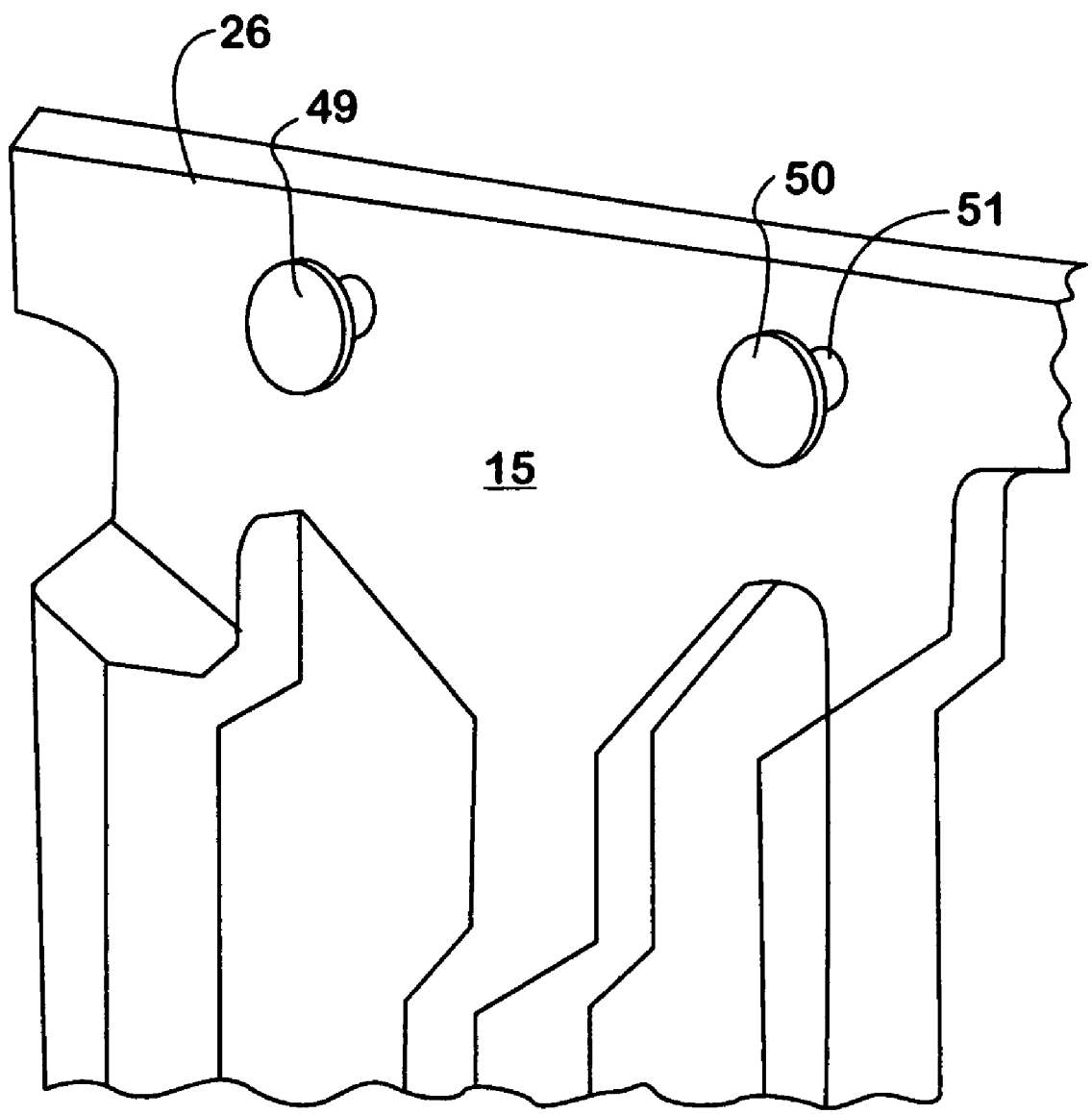
FIG. 12 is a perspective front view of one configuration of a grille of the invention.

The front reinforcement assembly 16 has a boss 48, 49 attached at the top. The boss 48 can be tapered or wedge-shaped with the narrower part of the boss 48 fastened to the front reinforcement assembly 16 (FIG. 10). The boss 49 can alternatively have a head 50 fastened to the front reinforcement assembly 16 with a shank 51 (FIG. 12). The boss 48, 49 is preferably self-lubricating with a plastic sleeve, such as polytetrafluoroethylene, or a service coating.

Alternatively, the track can be located on the front reinforcement assembly 16 with the boss 49 located on the front face of the grille 15 (FIG. 12).

A spring 52 engages the back face 32 of the grille 14 and the cooling module 18. The spring 52 can attach to the grille 14 and the cooling module 18, such as to a knob 54, 56 in the back face 32 of the grille 14 and/or the cooling module 18. The spring 52 can attach with adhesive to the knob 54. The spring 52 can also thread onto a threaded knob 54.

Figure 5:
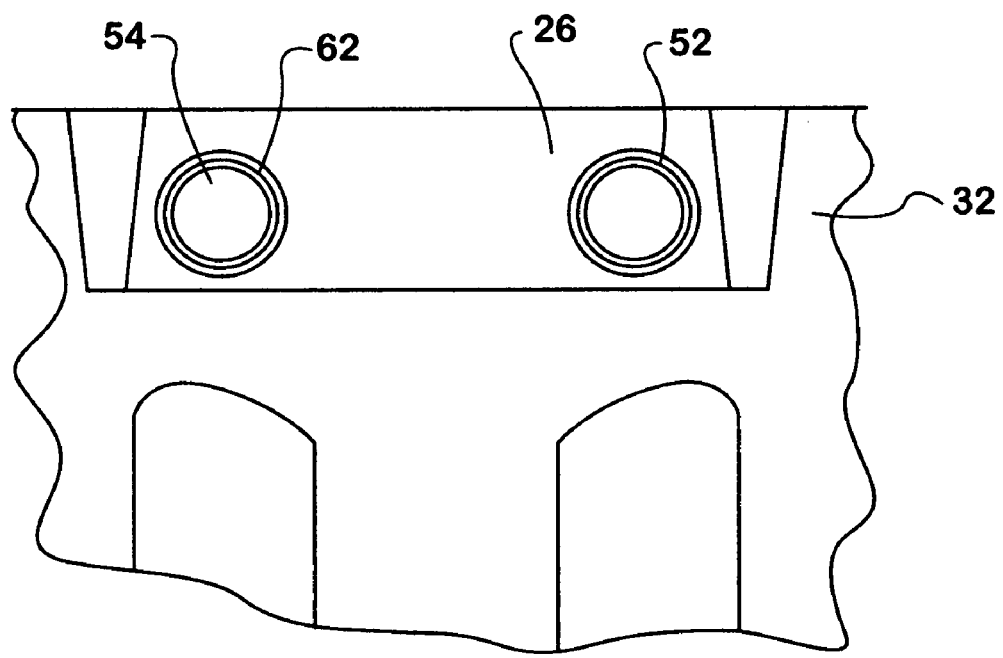
FIG. 5 a partial back plan view of the top portion of a grille of the invention.
Figure 6:
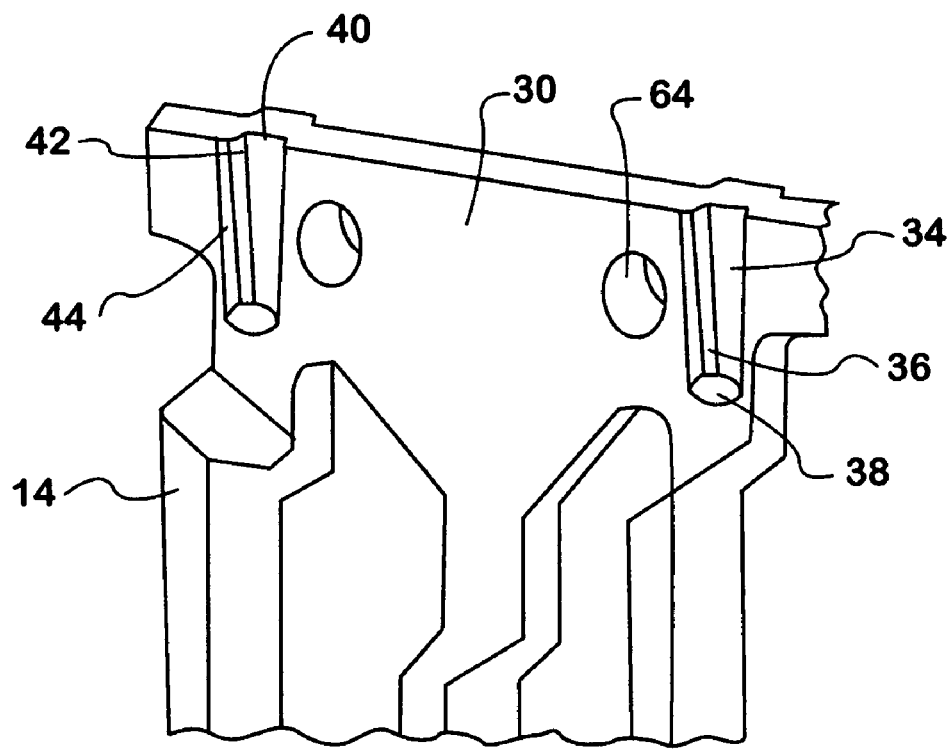
FIG. 6 is a partial perspective front view of the front frame of a grille of the invention.
Figure 7:
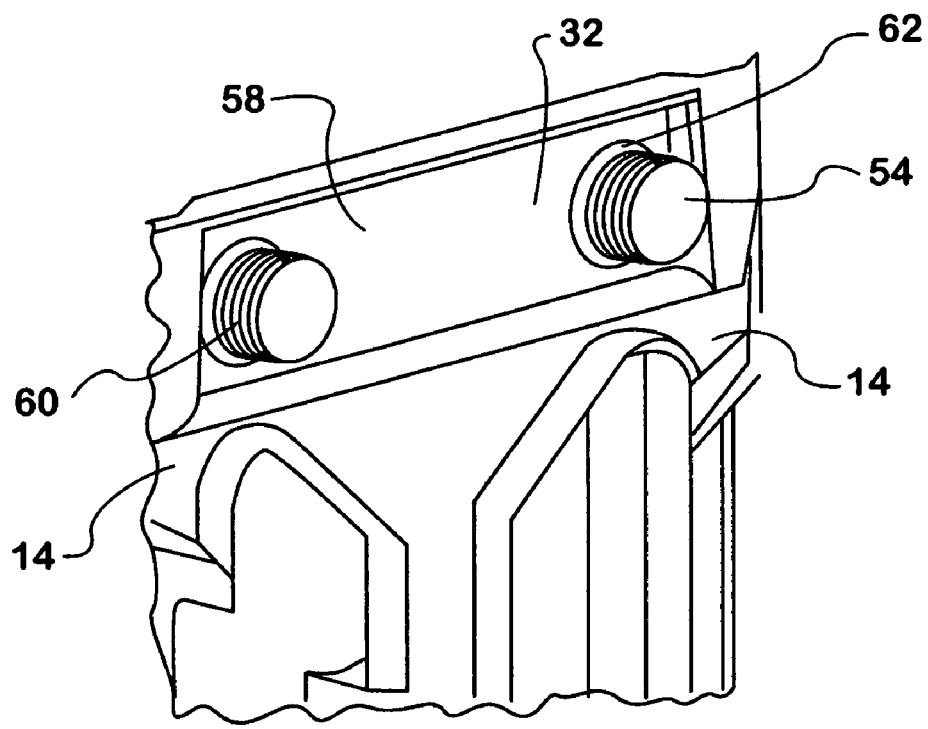
FIG. 7 a partial perspective back view of the front frame of a grille of the invention.
Figure 8:
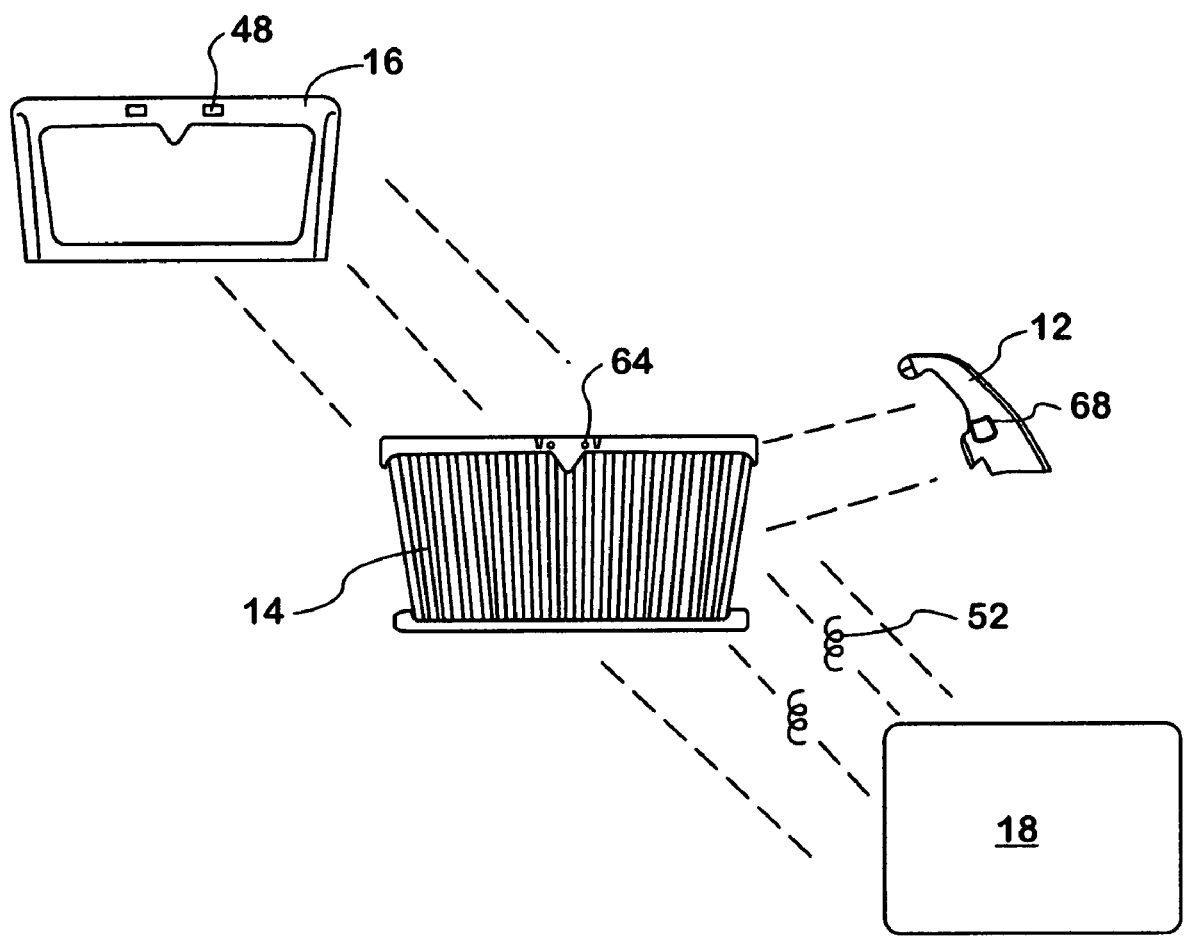
FIG. 8 is a exploded view of a front reinforcement assembly of the hood, a partial side of the hood, a cooling module and a grille in one configuration of the invention.

As shown in FIGS. 5 and 7, one or more cylindrical knobs 54 are located in the back face 32 of the top frame 26 of the grille 14 and can be located near one of the tracks 34. The knob 54 can form in a cut-out 58 or a groove in the back face 32 or project outwardly from the back face 32. The knob 54 can have thread 60 and/or be tapered if desired, with the diameter of the knob 54 greater at the knob's base 62. The knobs 54 can be hollow, forming a socket 64 in the opposite front face 30 of the top frame 26.

The grille 14 and hood 12 are hinged together. The hinge is preferably a living hinge with a hinge pin 70 pivotally coupling within a hinge receiver 68. Preferably the hinge pin 70 projects laterally from a hinge extension 72. The hinge extension 72 extends laterally from the bottom 21 of each side of the grille 14. The hinge extension 72 has a base 74 projecting laterally from the bottom frame 28 and an arm 76 approximately perpendicular to the base 74. The hinge pin 70 projects from the arm 76. A hinge rib 78 can span between the arm 76 and the bottom 21 of the grille 14.

Alternatively, the hinge pin can project from the hood and the hinge receiver can be located at the bottom of the grille (not shown).

The grille of the invention is self-aligning and hinged to the hood. Instead of being hard-mounted directly to the cooling module like fixed grilles, the bottom of the grille hinges directly to the hood at the bottom of the grille. This location keeps the hinge out of the opening and out of sight.

During use, the top of the grille releasably couples to the hood with one or more male and female slip joints and is backed up by one or more springs engaging both the back face of the grille and the front face of the cooling module. The springs keep the grille engaged in the slip joints when the hood is closed while not preventing the grille from tracking with the hood. The female member of each slip joint allows the hood opening to deform or parallelogram and both the cooling module and hood to pitch and roll independent of each other during transport.

When the hood is closed, the female member guides the grille back into alignment, regardless of where the cooling module pulled the grille when the hood was opened. The springs help soften the vibrations produced by the engine and the road that are translated to the body components.

When the hood opens by rotating forward, the hinge allows the bottom of the grille to follow the hood's arc. This arc is the grille's axis of rotation and relates to the hood's axis of rotation. If the grille and hood axes of rotation during hood opening are not the same, the spring compensates and allows the grille to move. The force from the spring drives the male and female members of the slip joint together. Once the spring releases, the spring pushes the grille forward. Upon full release of the spring, the grille will remain held nearly vertical.

As the hood continues rotating forward to open, the male member of the slip joint disengages from the female member and the hinge allows the grille to remain in place with the spring fully released. The male member of the slip joint slides forward and upward to disengage from the female member. The hood continues forward as the grille rotates in the hood front reinforcement. This action allows the hood to continue to open without the grille in the grille opening.

When the hood closes, the hinge allows the hood to move toward to until the grille is replaced within the grille opening. The male member engages the female member to form the slip joint and the hood compresses the spring.

A proper spring force prevents the grille from sliding excessively in the male and female slip joint when the vehicle is used in service. This reduces the wear and tear on the male and female slip joint. A sufficient spring force keeps the grille and front reinforcement coupled in the slip joint while allowing the spring to sufficiently flex to allow the relative motion between the cooling module and the coupled hood and grille.

Therefore, the grille of the invention compensates for the tolerance stack-up during assembly while allowing a sufficient gap between the hood and grille to prevent their contact during use. The male and female slip joints keep the grille well-aligned within the vehicle. The grille further allows easy access to the engine compartment without fully raising the hood.

While the invention is shown in only one of its forms, it is not thus limited but is susceptible to various changes and modifications without departing from the spirit and scope of the invention.

What is claimed is:

1. A grille for a motor vehicle, comprising:
   a top;
   a bottom opposite the top;
   a frame having a bottom frame at the bottom, a top frame at the top having opposite front and back faces, and opposite side frames being located between the top and bottom frames;
   a track in the front face of the top frame extending from the top toward the bottom, the track having sidewalls, an end wall, and a rear wall connecting to the sidewalls and the end wall;
   a cylindrical knob extending rearward from the back face of the top frame;
   a hinge extension extending laterally from the bottom of the frame;
   wherein the track tapers vertically;
   wherein the sidewalls slant outwardly from the rear wall;
   wherein the hinge extension further comprises:
      a base projecting laterally from the bottom frame; and
      a hinge pin projecting laterally from the hinge extension; and
   wherein the hinge extension further comprises:
      an arm approximately perpendicular to the base and supporting the hinge pin.

2. A grille for a motor vehicle of claim 1, wherein the knob is threaded.

3. A grille for a motor vehicle of claim 2, wherein the hinge extension further comprises:
   a rib between the arm and the side.

4. A grille for a motor vehicle of claim 2, further comprising:
   a spring attaching to the knob.

5. A grille mounted to a vehicle, comprising:
   a top;
   a bottom pivotally attaching to the vehicle with a hinge; and
   a frame having a bottom frame at the bottom, a top frame at the top having opposite front and back faces and being coupled to the vehicle with a male and female slip joint, and opposite side frames being located between the top and bottom frame;
   wherein the male and female slip joint further comprises:
      a track in the front face of the top frame extending from the top toward the bottom, the track having sidewalls, an end wall, and a rear wall connecting to the sidewalls and end wall;
   wherein the hinge further comprises:
      a hinge extension having a base projecting laterally from the bottom of the frame;
      a hinge pin projecting laterally from the hinge extension; and
      a hinge receiver pivotally coupling to the hinge pin; and
   a spring attaching to the back face of the top frame.

6. A grille mounted to a vehicle of claim 5, further comprising:
   a cylindrical knob extending rearward from the back face of the top frame and engaging the spring.

7. A grille mounted to a vehicle of claim 6, wherein the knob is threaded.

8. A motor vehicle, comprising:
   a cooling module;
   a grille comprising a top, a bottom opposite the top, and a frame having a bottom frame at the bottom, a top frame at the top having opposite front and back faces, and opposite side frames being located between the top and bottom frames;
   a hood pivotally coupling with the bottom of the grille and forming a hinge;
   a front reinforcement assembly attaching to the hood and being coupled to the front face of the top frame of the grille using a male and female slip joint; and
   a spring engaging the back face of the grille and the cooling module.

9. A motor vehicle of claim 8, wherein the male and female slip joint further comprises:
   a track having sidewalls, an end wall, and a rear wall connecting to the sidewalls and the end wall; and
   a boss engaging the track.

10. A motor vehicle of claim 9, wherein the track tapers vertically.

11. A motor vehicle of claim 10, wherein the sidewalls slant outwardly from the rear wall.

12. A motor vehicle of claim 11, wherein the track is located in the front face of the top frame extending from the top toward the bottom.

13. A motor vehicle of claim 12, wherein the hinge further comprises:
   a hinge extension extending laterally from the bottom of the grille at each side and having a base projecting laterally from the bottom frame of the grille, and a hinge pin projecting laterally from the hinge extension;
   and a hinge receiver on the hood being pivotally coupled to the hinge pin.

14. A motor vehicle of claim 13, wherein the hinge extension further comprises:
   an arm approximately perpendicular to the base and supporting the hinge pin.

15. A motor vehicle of claim 14, wherein the hinge extension further comprises:
   a rib between the arm and the side of the grille.

16. A motor vehicle of claim 15, wherein the grille further comprises:
   a cylindrical knob extending rearward from the back face of the top frame and engaging the spring.

17. A motor vehicle of claim 16, wherein the knob is threaded.

* * * * *